United States Patent
Wood et al.

(10) Patent No.: US 11,493,691 B1
(45) Date of Patent: Nov. 8, 2022

(54) SIMPLIFIED LENS FOR PHOTONIC INTEGRATED CIRCUITS

(71) Applicant: Insight Lidar, Inc., Lafayette, CO (US)

(72) Inventors: Christopher Wood, Lafayette, CO (US); Russel E. Sibell, Longmont, CO (US)

(73) Assignee: INSIGHT LIDAR, INC., Lafayette, CO (US)

( * ) Notice: Subject to any disclaimer, the term of this patent is extended or adjusted under 35 U.S.C. 154(b) by 231 days.

(21) Appl. No.: 16/875,600

(22) Filed: May 15, 2020

Related U.S. Application Data

(60) Provisional application No. 62/886,593, filed on Aug. 14, 2019, provisional application No. 62/848,209, filed on May 15, 2019.

(51) Int. Cl.
*G02B 6/26* (2006.01)
*G02B 6/42* (2006.01)

(52) U.S. Cl.
CPC ........... *G02B 6/262* (2013.01); *G02B 6/4206* (2013.01); *G02B 6/4246* (2013.01)

(58) Field of Classification Search
CPC .... G02B 6/262; G02B 6/4246; G02B 6/2938; G02B 6/4206; G02B 6/4214; G02B 27/1006; H04B 10/11; H04B 10/2504; H04B 10/40
USPC ............................ 385/14, 24, 36, 49, 88–93
See application file for complete search history.

(56) References Cited

U.S. PATENT DOCUMENTS

| | | | |
|---|---|---|---|
| 2014/0010498 A1* | 1/2014 | Verslegers | G02B 6/34 385/37 |
| 2019/0137706 A1* | 5/2019 | Xie | G02B 6/4232 |

* cited by examiner

*Primary Examiner* — Michael P Mooney

(57) ABSTRACT

An optical system is provided including a photonic integrated circuit and an optical lens system. The photonic integrated circuit includes an emission interface surface and a spatial array of apertures. The spatial array of apertures has a high numerical aperture (NA) of greater than 0.2 and includes a plurality of apertures spatially distributed across the interface surface. The optical lens system interfaces the photonic integrated circuit with free space by: receiving emitted light from the spatial array of apertures and altering a trajectory of the emitted light into the free space and receiving returning light from the free space and altering a trajectory of the returning light, such that the returning light is received by the spatial array of apertures.

17 Claims, 7 Drawing Sheets

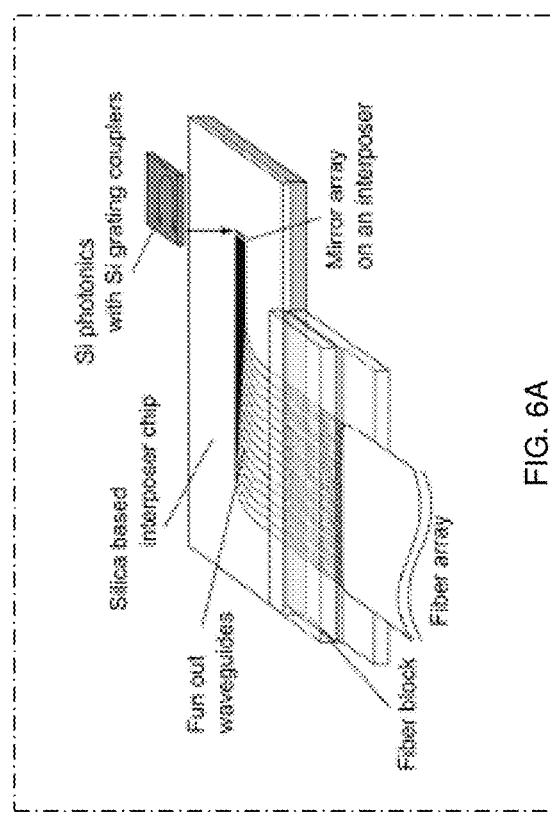
FIG. 6A
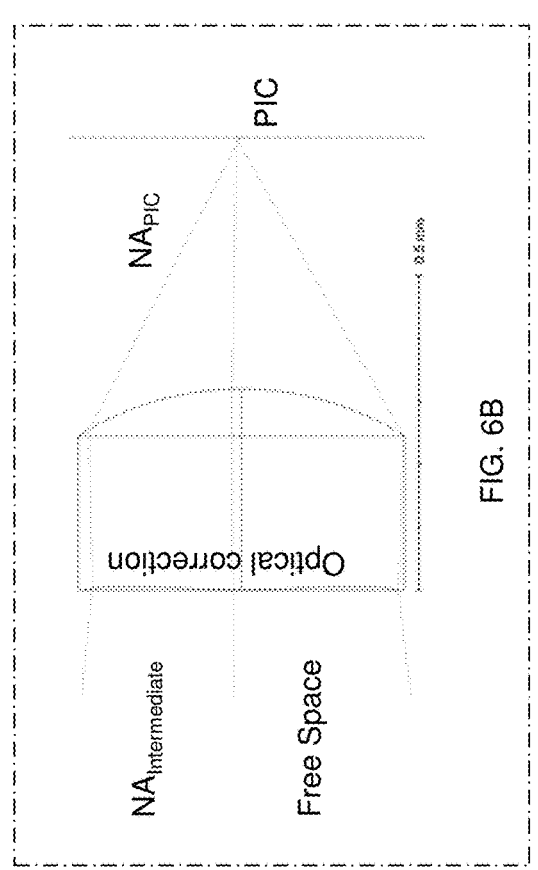
FIG. 6B
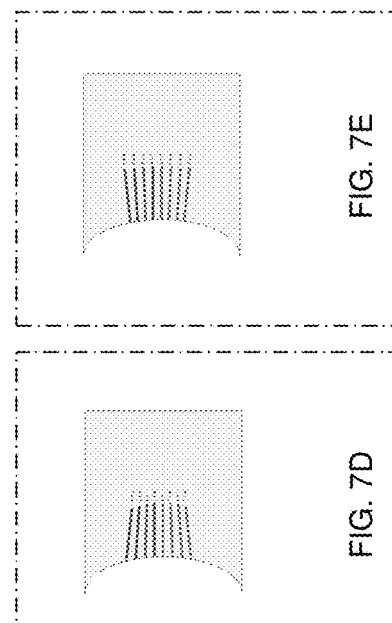
FIG. 7E
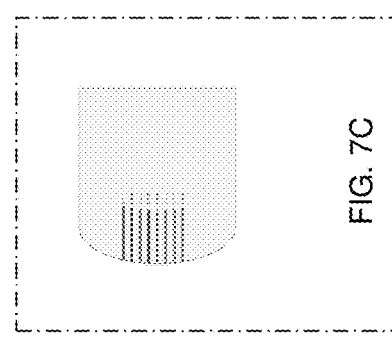
FIG. 7D
FIG. 7C
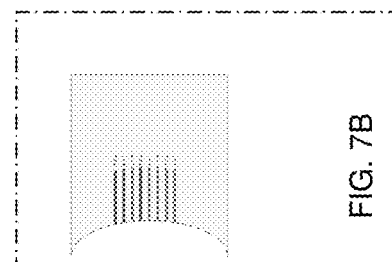
FIG. 7B
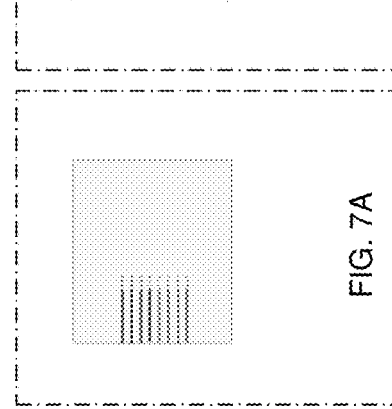
FIG. 7A

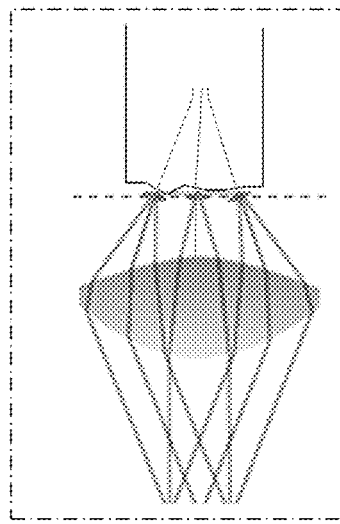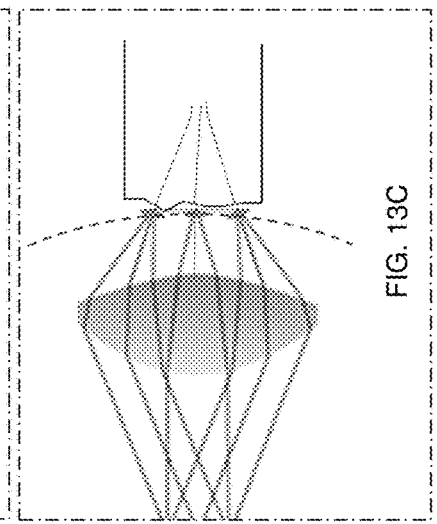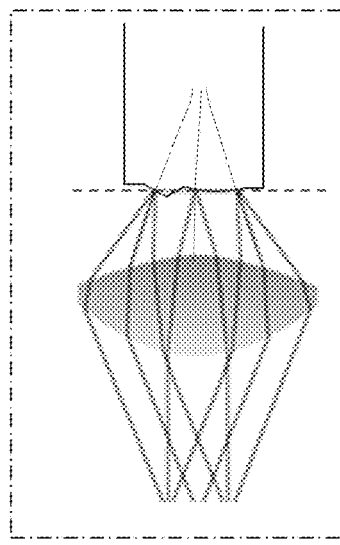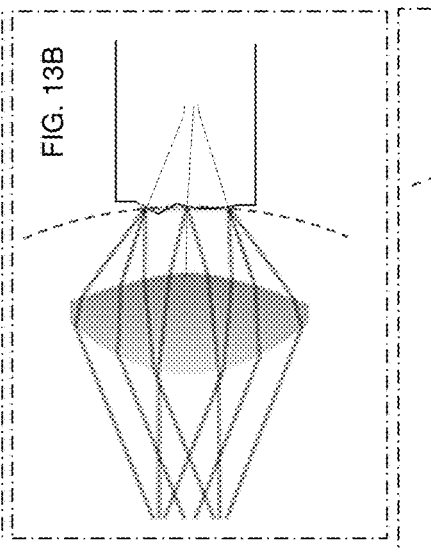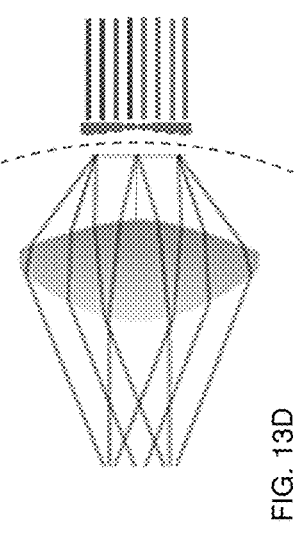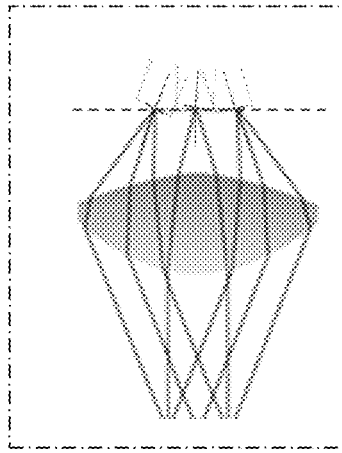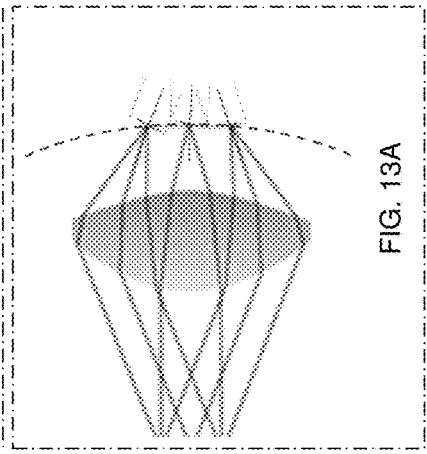

SIMPLIFIED LENS FOR PHOTONIC INTEGRATED CIRCUITS

RELATED APPLICATIONS

This application claims the benefit of U.S. Application No. 62/886,593 filed on Aug. 14, 2019 and U.S. Application No. 62/848,209 filed on May 15, 2019, which is herein incorporated by reference in its entirety.

TECHNICAL FIELD

The present invention relates generally to an optical lens system and more particular to an optical lens system used in conjunction with photonic integrated circuits (PICs).

BACKGROUND

For most applications where optical beams are emitted from a photonic integrated circuit (PIC) into free space, a complex lens must be used to control that emission. Typically, and historically, that complex lens involves multiple individual lenses packaged together (a 'multi-element' lens). High volume applications require simpler manufacturability, low cost, and simplified alignment procedures that preclude the use of traditional multi-element lens (or compound lens) systems. Means to implement the same overall optical performance, but with the use of far simpler optical lens designs via coupling of the lens system to the manner in which light is emitted by the PIC, provide a path to low-cost mass production of photonic circuit-based devices.

SUMMARY

The present disclosure describes various means to simplify the overall optical lensing system associated with emission of light by a photonic integrated circuit (PIC). It is understood that the concepts here are reciprocal, and apply to both input and output of light for the PIC. Specifically, elimination of costly and complex multi-element lens designs in favor of (1) a single lens coupled to a PIC whose emission properties are tailored, or (2) a simplified traditional lens plus a microlens ("macrolens plus microlens") coupled to a PIC with tailored emission properties are detailed. These implementations take advantage of the ability to carefully shape the way in which light is emitted by the PIC, or by the PIC and microlens combination, so as to partially or completely correct for complex optical aberrations. In some cases this correction enables the elimination of a highly-corrected multi-element lens in favor of a simple, single lens. Such designs are particularly advantageous for applications where beam scanning occurs, and/or off-axis operation is required by the optical system.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 6A is schematic diagram of an exemplary commercial interposer.

FIG. 6B is a schematic diagram of an exemplary microlens acting also as an NA converter.

FIGS. 7A-7E depict alternative embodiments of an interface surface of a PIC.

FIG. 12A is a schematic depiction of an angled surface leading to simplified optical correction.

FIG. 12B is a schematic diagram of a PIC using an angled interface surface.

FIG. 12C is a schematic diagram of a PIC having an angled interface surface and microlenses.

FIGS. 13A-13D are schematic diagrams of a PIC having an effectively non-planar interface surface.

Figure 1A:
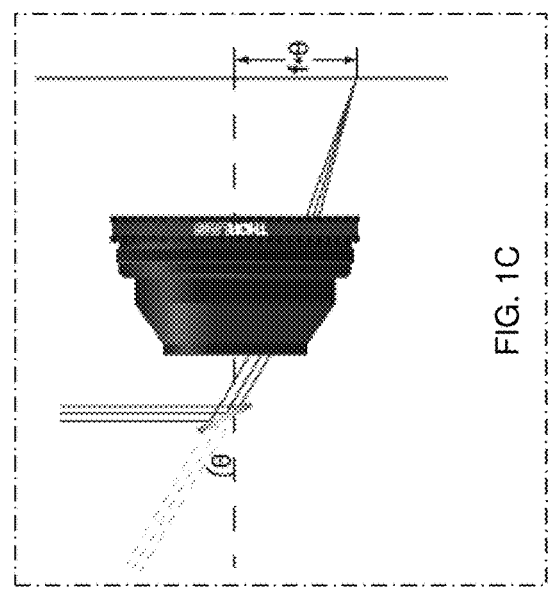
FIG. 1A is a schematic diagram depicting light passing through a spherical lens when scanning.
Figure 1B:
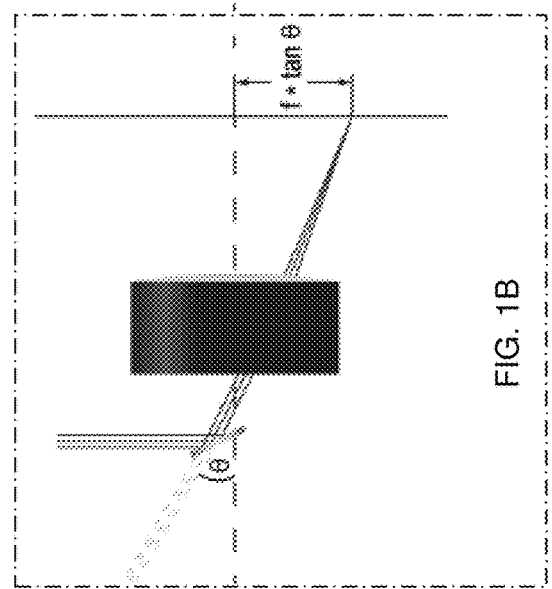
FIG. 1B is a schematic diagram depicting light passing through a flat-field lens when scanning.
Figure 1C:
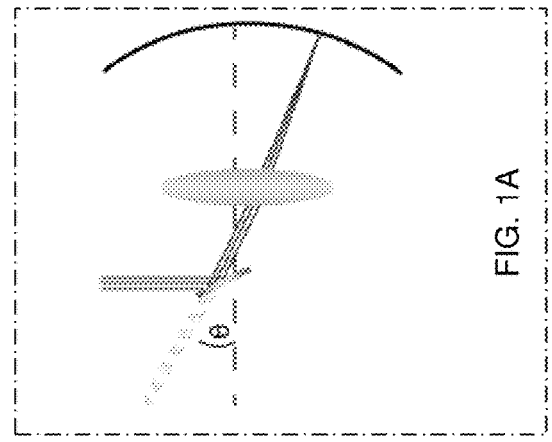
FIG. 1C is a schematic diagram depicting light passing through an F-Theta lens when scanning.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The shortfalls of using a simple lens in a scanning or imaging system, especially when off-axis performance is necessary, are well known. FIGS. 1A-1D summarize this situation, showing that (1) a simple spherical lens results in a spherical image plane, (2) a flat-field scanning lens can improve this situation and provides for a planar image plane, and (3) an F-Theta lens further improves the flat-field design and provides a simple and well-known linear relationship between the beam angle and its offset from lens center. This type of lens analysis is most common for the situation where the system requirement is for an incoming beam with an angular offset to be focused or imaged onto a planar image surface regardless of the angular offset.

Figure 2A:
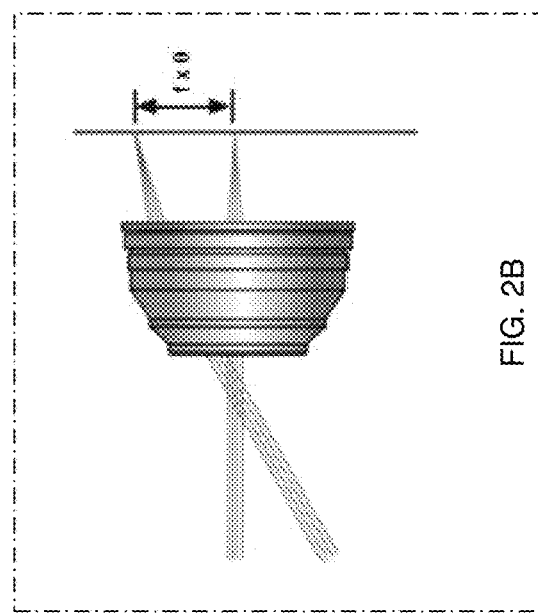
FIG. 2A is a schematic diagram depicting multi-beam, multi-angle light passing through a simple lens.
Figure 2B:
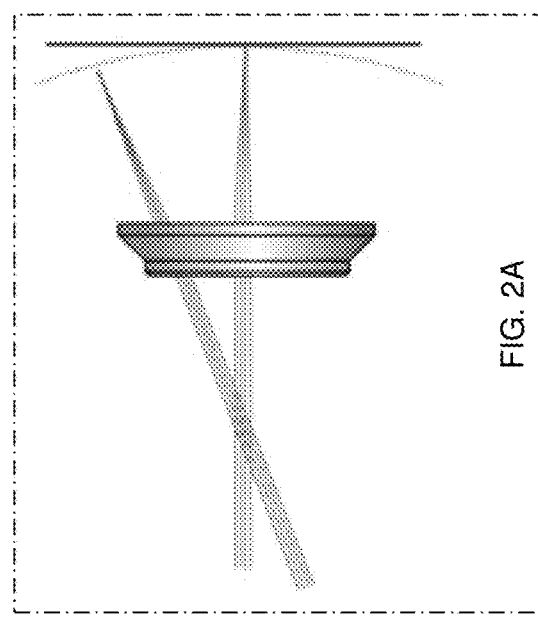
FIG. 2B is a schematic diagram depicting multi-beam, multi-angle light passing through an F-Theta lens.

These types of lens configurations represent a starting point for a different analysis, where the requirement is instead for emission of light from an array of apertures located on a surface. This situation approximates the reverse situation from the traditional scenario above. In that case, these lens designs may still serve to begin the analysis for such a multi-beam, multi-angle scenario with off-axis performance. FIGS. 2A and 2B indicate how this situation may be viewed with multiple such beams, here assuming that the focal plane shown represents instead the origin of a light source (an optical aperture with an optical mode structure) rather than an image plane for a beam coming from the other direction. For example, the F-Theta lens shown in FIG. 2B represents a potentially improved scenario if that focal plane represents a spatially-distributed array of apertures from a photonic integrated circuit (PIC), since a planar interface surface (also referred to as an emission surface) for a PIC is common. A further improvement to the F-Theta lens is shown in FIG. 3A.

Figure 3A:
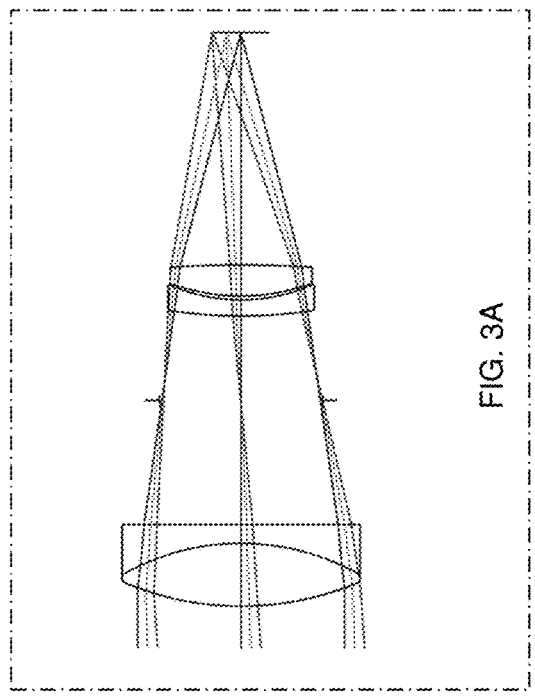
FIG. 3A is a schematic diagram depicting multi-beam, multi-angle light passing through an F-Theta telecentric lens formed by multiple groups of lenses.
Figure 3B:
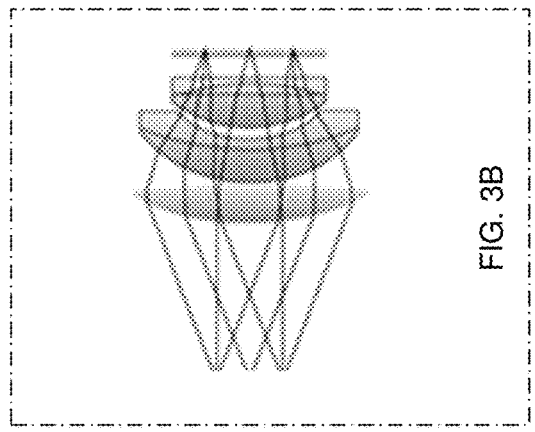
FIG. 3B is a schematic diagram depicting multi-beam, multi-angle light passing through a lens including a single group of multiple lenses.

The configuration shown in FIG. 3A is known as an F-Theta Telecentric lens and it accommodates a planar focal plane, but additionally constrains the central ray of the beams to normal incidence with respect to that plane. This lens configuration again represents a logical starting point for the proposed operation with an array of PIC apertures at the focal plane, as those apertures would nominally emit (or receive) light at normal incidence to the plane. The traditional lens designs shown in FIGS. 1A-1C, 2A, 2B, 3A, and 3B involve multiple lenses arranged into lens groups. For example, FIG. 3A shows multiple lenses arranged into multiple groups and FIG. 3B shows multiple lens arranged into a single group.

Figure 4:
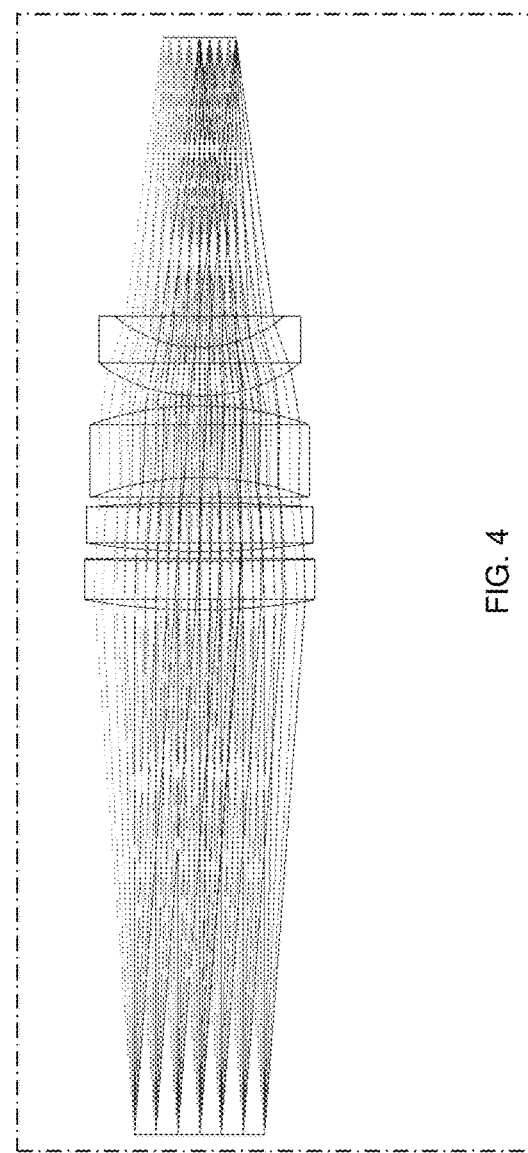
FIG. 4 is a schematic diagram of an array of apertures spatially distributed in the plane of a PIC and light propagating to free space via an F-Theta telecentric lens.

The use of multiple elements and even multiple glass types is commonly used to perform further corrections such as color correction (for broadband or multi-color optics) or temperature correction (for wide temperature range operation). These concepts and designs do not offer a full solution to the problems addressed by this disclosure. As a final example, FIG. 4 shows a solution to the problem of an array of apertures spatially distributed in the plane of a PIC, when those apertures have a low value for the Numerical Aperture (NA). On the left of FIG. 4, a grouping or angular pattern of collimated beams, emitted at slightly different angles is shown. On the right of FIG. 4, an array of apertures with low NA is shown. When the array is composed of a spatially distributed set of standard optical fibers with NA~0.13, standard lens techniques taken from the above examples provide for the solution in FIG. 4. The array of seven emitters on the right side sends light through a custom F-Theta Telecentric lens design and results in seven collimated, diffraction-limited beams with 7 different angles based upon the offset of each respective fiber from the lens axis.

Figure 5:
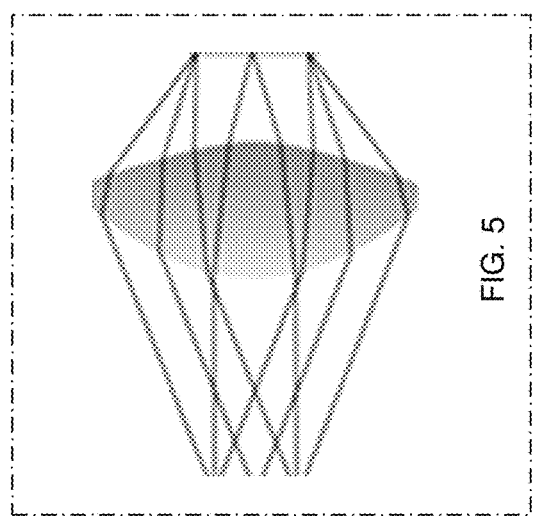
FIG. 5 is a schematic diagram of multi-beam, multi-angle light passing through a single perfect F-Theta lens.

FIG. 5 shows an idealized situation for the above scenario, where a single 'perfect' F-Theta lens replaces the complex arrangements above. In some situations where the NAs involved are low, it is possible to fabricate such a lens. However, when the NA becomes large, a single-lens solution is generally not possible for off-axis operation. For PICs fabricated in silicon, silicon nitride, or compound semiconductors, for example, due to the indices of refraction and small waveguide dimensions the corresponding NAs can be in the 0.3-0.8 range. It is well known that a system requiring high NA results in a much more complicated lens design, especially when near-diffraction-limited performance is involved.

One method for dealing with high NA emission from PICs is the use of an interposer, as shown in FIG. 6A. This intermediary element is especially useful when the desire is to maintain a small distance between apertures on a PIC (keeping its dimensions and cost small) but still accommodating an interface to optical fiber where the aperture separation must be much larger. In this sense, it allows the small pitch of the PIC to be converted to the large pitch for the fibers. In this process, the NA is simultaneously converted from the high value for the PIC to the low value for the fiber, albeit by using mode converters, tapers, and other elements which can add substantial optical losses (~3 dB or more) to the system. These types of interposers do not correct for optical aberrations as the conversion is generally between a single optical mode diameter to a different single optical mode diameter.

For the situation with free-space optical beam propagation, a form of interposer would also be useful for converting the high NA of the PIC to a lower NA that is more amenable to simple and inexpensive lens design with fully-corrected (diffraction-limited) beams. An optical microlens, as shown in FIG. 6B, can perform both these functions. Here the resulting NA after the microlens does not represent the final optical beam but rather serves to convert the initially high NA to a smaller value while also allowing substantial optical corrections to be imposed onto the propagating beam. These imposed optical corrections for the microlens represent the prescription required such that all other optical elements in the system (especially the common macrolens) become simpler and less expensive.

The above discussions lead to several novel means to implement a low-cost optical lens system that results in diffraction-limited performance from a spatially-distributed array of high-NA apertures on a PIC: (1) 'shaping the PIC', which provides for off-axis optical correction but does not necessarily provide for NA conversion, (2) 'microlens', which provides for both off-axis optical correction and NA conversion, and (3) 'shaping the PIC and microlens', which again provides for both off-axis optical correction and NA conversion. Generally, the optical system described herein adds unique complexity to the PIC and/or a microlens, which are both manufactured at wafer scale using high-volume, low-cost methods, so that complexity may be removed from any traditional lens elements which are manufactured using conventional methods with higher cost.

The result is a more cost-optimized, manufacturable solution that still satisfies high performance requirements.

Figure 8A:
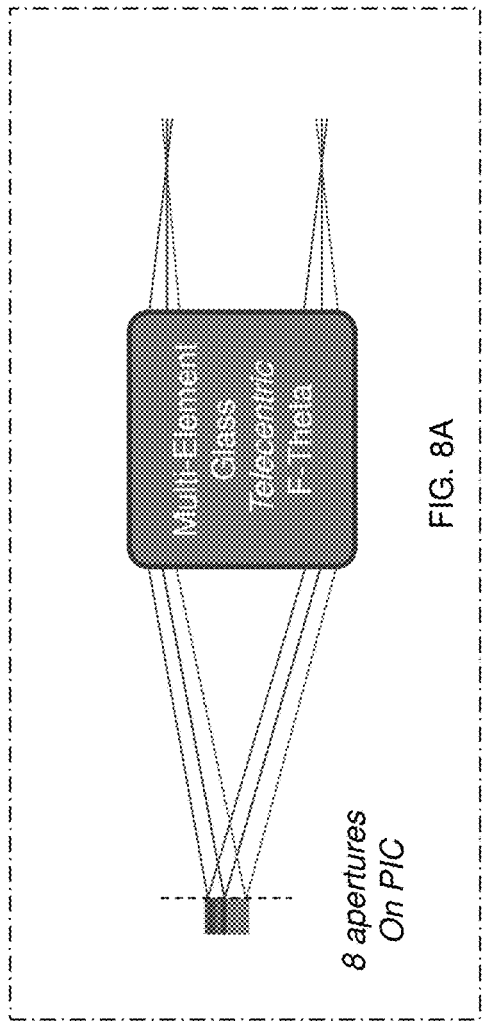
FIG. 8A shows a spatial array of apertures having a flat interface surface, and requiring a conventional multi-element F-Theta telecentric lens for acceptable propagation to free space.
Figure 8B:
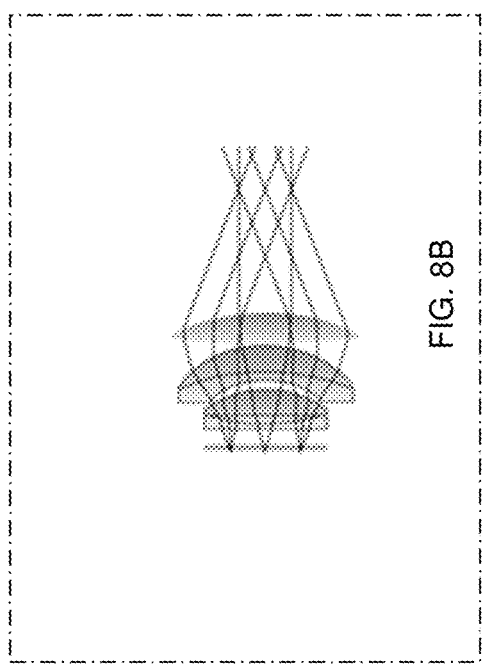
FIG. 8B shows an exemplary F-Theta Telecentric lens design detail for the spatial array of apertures of FIG. 8A.
Figure 8C:
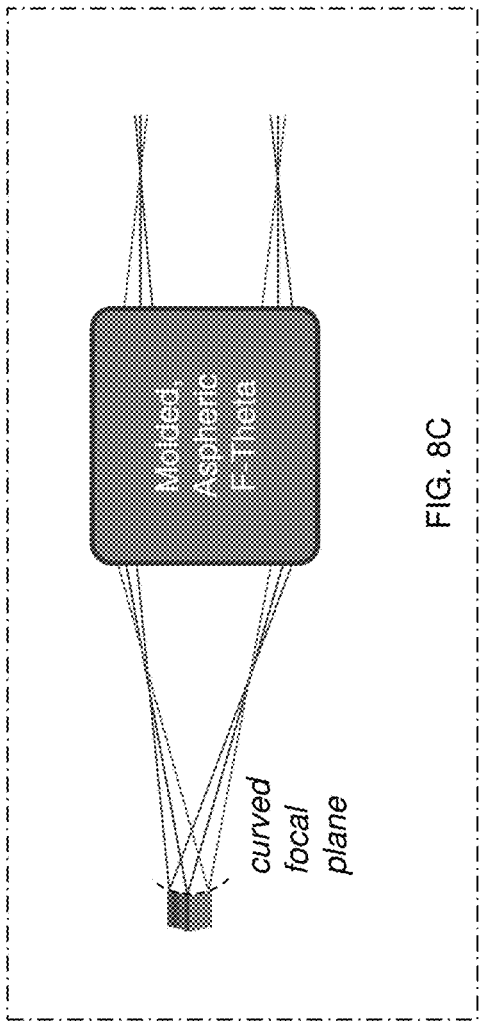
FIG. 8C shows a spatial array of apertures for an exemplary embodiment having a shaped interface surface, and the resulting simplified lens.
Figure 8D:
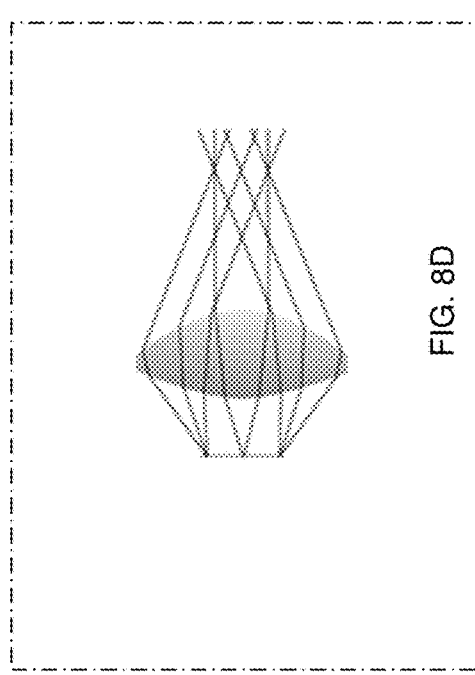
FIG. 8D shows an exemplary, simpler F-Theta lens design for the spatial array of apertures of FIG. 8C.

FIGS. 7A-7E show alternative embodiments of differently shaped emission surfaces of the PIC. By 'shaping the PIC', the complexity of the resulting optical lens system can be reduced for a PIC with a spatial array of apertures. The emission surface of the PIC may be shaped with a functional form that provides a first layer of effective optical correction (removing the telecentricity requirement, for instance), or the waveguides and apertures within the PIC may be angled to provide for directional emission from the apertures (again removing the telecentricity requirement), or both may be implemented. Since it is generally simpler to design an F-Theta lens compared to an F-Theta Telecentric lens, these adaptations result in a simpler overall lens design. FIGS. 8A-8D show the result of such a design, with FIG. 8A showing the PIC apertures and FIG. 8B detailing the 'conventional' F-Theta Telecentric lens design. FIG. 8C shows the PIC apertures with a shaped emission surface and FIG. 8D details the resulting simpler F-Theta lens design comprising a single molded aspheric lens rather than a compound lens.

Figure 9A:
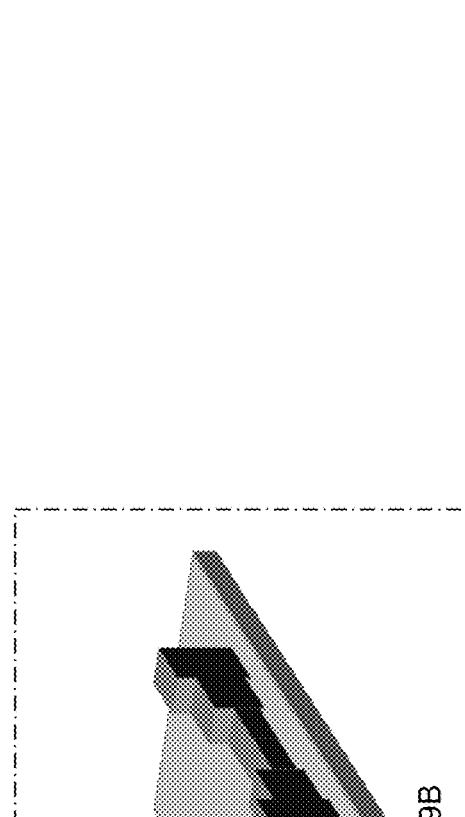
FIGS. 9A and 9B show an exemplary microlens structure simulating the creation of a shaped interface surface.
Figure 9B:
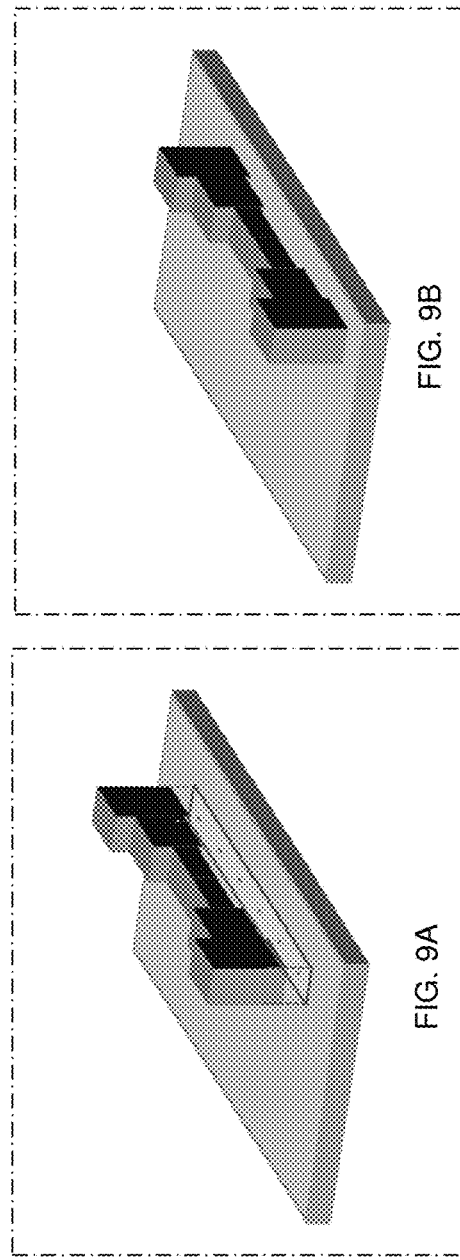
Figure 10:
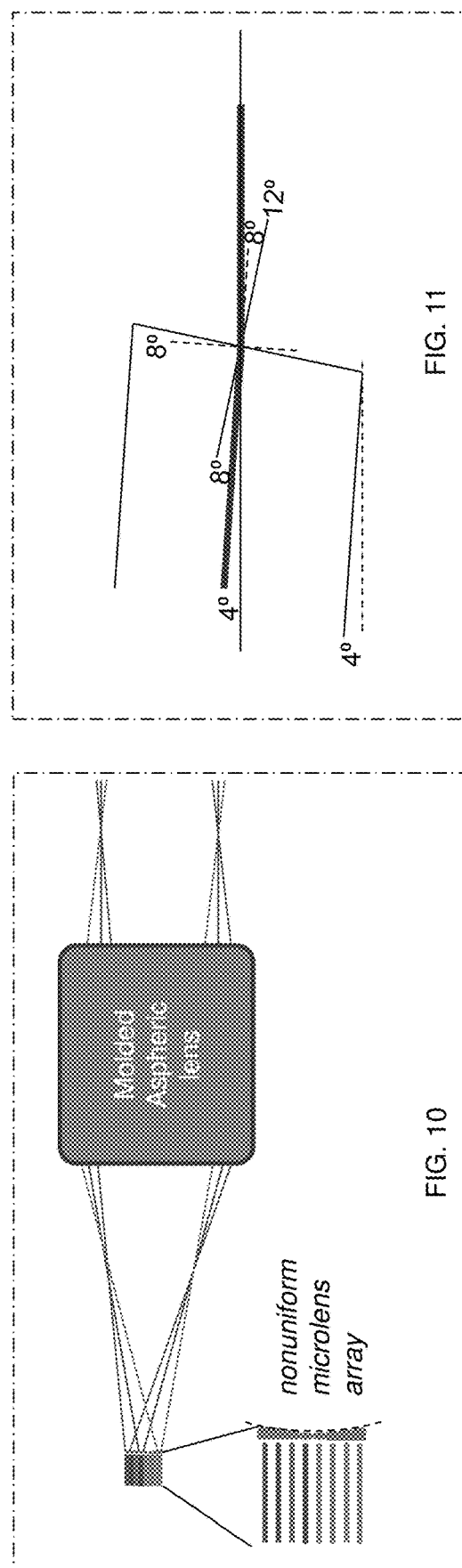
FIG. 10 is a schematic view of light emitted from a microlens similar to that depicted in FIG. 9B.

FIGS. 9A and 9B show exemplary microlens structures with a similar function compared to the shaped emission surface. The microlens is lifted away from the emission surface in FIG. 9A to show the relative position of the spatial array of apertures and FIG. 9B shows the microlens positioned on the emission surface. Here, the microlens is used to create an effective shaping of the design surface from the PIC and microlens combination. As FIG. 10 shows, the result of using such a microlens is again an effective spherical image plane that allows the remaining lens design to move from F-Theta Telecentric to something simpler. A principal goal of these efforts is to simplify the overall lens design so much that the larger lenses ('macrolenses') may be molded lenses rather than conventional polished or diamond-turned lenses. This again substantially reduces the cost associated with the macrolenses, and it is often easier to incorporate the use of aspheric surfaces. Such microlens designs may be spatially uniform or nonuniform and may be applied to either PIC surface emission or PIC edge emission. Finally, a 'shaped PIC+microlens+macrolens' or 'shaped PIC+macrolens' concept may also be used to implement both color correction and temperature correction, in the manner traditionally understood with multi-element lenses.

Figure 11:
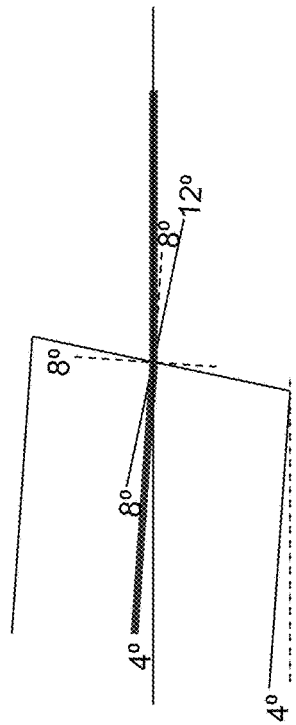
FIG. 11 is an exemplary alternative embodiment of a shape for the interface surface, in analogy to that used for angled optical fiber interfaces.

FIG. 11 shows yet another example for shaping the surface of a PIC. Optical fiber frequently uses an angled surface for emission due to the dramatically reduced back-reflection from such a fiber endface. But it does result in the emission from the fiber endface occurring at a non-normal incidence. This unfortunate consequence for fiber may be turned into a benefit when applied to PICs and specifically when used in conjunction with a free space lens system to provide for a portion of the required optical correction. Angled emission from the surface or edge of a PIC may be realized through processing techniques such as cleaving, chemical etching, reactive ion etching, polishing, and bonding, among other means. FIG. 12A shows the concept of how this angled surface leads to a simplified optical correction. Here, instead of a PIC, FIG. 12A indicates that if a collection of 3 angled fibers were configured as shown, then the required lens would be an F-Theta rather than an F-Theta Telecentric, thereby simplifying the macrolens design. FIG. 12B then shows what an actual PIC would look like, if implemented with this angled emission surface concept. Finally, FIG. 12C shows the same configuration but using both angled emission surfaces as well as microlenses, as the microlenses can serve as NA converters with complex optical correction as above and further simplify the macrolens. All these configurations result in a simpler macrolens design, at the expense of a more complicated PIC or PIC and microlens.

FIGS. 13A-D show that these concepts do not require the use of a planar PIC aperture surface (on average), but rather that surface may be spherical or some other complex shape (on average). FIG. 13A again shows the concept, using properly positioned angled optical fiber endfaces, resulting in a spherical surface from which to begin the macrolens design. This shows that the lens can at least become an F-Theta rather than F-Theta Telecentric, and maybe even simpler. FIG. 13B and FIG. 13C are the same as for FIG. 12B and FIG. 12C, above, but with a spherical PIC aperture surface rather than planar. FIG. 13D shows a final design where the PIC itself has a planar surface for the apertures but a microlens array is used to convert this planar surface to a spherical surface to simplify the macrolens design and provide for substantial optical correction.

Figure 14:
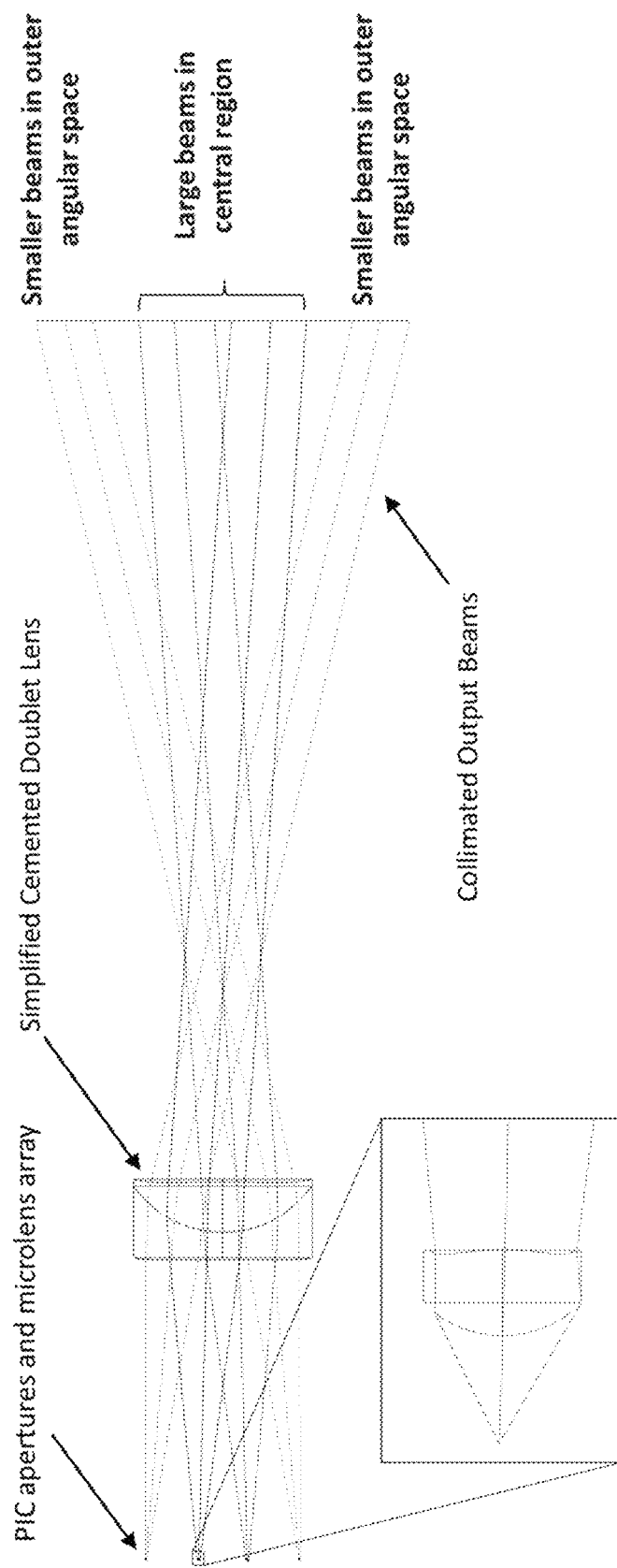
FIG. 14 depicts an exemplary simplified optical system including a microlens array and a common macrolens in conjunction with a spatial array of PIC apertures.

FIG. 14 shows a detailed version of an actual system design, using the concepts above, with an optical ray-tracing analysis. In this design the microlenses each have surface figures (both sides of the lens) which are dependent on their radial position from the center of the macrolens-(doublet). Uniquely, the lenses in the array can have different radial distances and each beam can be independently modeled with different NAs to give different output beam diameters. Note in the figure that the outer beams are smaller in diameter than the inner ones. This performance feature cannot be achieved using the traditional lens approach, and is highly desirable for situations where the central beams are more critical than the outer beams, such as with some angularly-scanned applications.

The inset from this figure shows one of the microlenses of the array. The convex surface is spherical (some of the outermost lenses in the array are toric on this surface). The remaining surface is an even asphere. Note that the center of the lens is not precisely aligned with source. There is a spatial offset which also serves to correct some of the aberration in the doublet. The offset creates an effect that the source points at a slight angle to the optical axis of the system. In this example there are only 4 output beams shown, but the full model for this system has 24 beams (apertures).

In the case of the doublet that was modeled here, the two outer faces are both aspheric surfaces. However, the interface between the two lenses of the doublet is spherical. This makes bonding the two lenses together simpler and gives some relief to the difficulty of their mutual alignment when bonding, and further allows this 2-element macrolens to be assembled and then treated as a single element. We further note that the use of a doublet here with two different materials greatly improves the color correction and temperature correction, relative to a single lens. The Zemax model for FIG. 14 indicates that all collimated beams are well within the RMS (Root Mean Square) diffraction limit at the design wavelength of 1310 nanometers.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An optical system comprising:
a photonic integrated circuit including:
an interface surface;
a spatial array of apertures located on the interface surface and configured to emit and receive light normal to the interface surface, wherein:
the spatial array of apertures has a high numerical aperture (NA) of greater than 0.2; and
the spatial array of apertures includes a plurality of apertures spatially distributed across the interface surface; and
an array of waveguides configured to provide electromagnetic radiation propagation to or from the spatial array of apertures;
an optical lens system configured to interface the photonic integrated circuit with free space by:
receiving emitted light from the spatial array of apertures and alter a trajectory of the emitted light into the free space; and
receive returning light from the free space and alter a trajectory of the returning light, such that the returning light is received by the spatial array of apertures.

2. The optical system of claim 1, wherein the interface surface is flat such that a portion of light propagation associated with each aperture of the spatial array of apertures is parallel with a portion of light propagation associated with other apertures of the spatial array of apertures.

3. The optical system of claim 1, wherein the interface surface is concave such that a central axes of light propagated by the spatial array of apertures converge.

4. The optical system of claim 1, wherein the interface surface is convex such that a central axes of light propagated by the spatial array of apertures diverge.

5. The optical system of claim 1, wherein the interface surface includes multiple angles along a first dimension causing optical beams propagated from apertures of the spatial array of apertures located along the multiple angles to deviate from normal incidence with respect to an average angle of the interface surface.

6. The optical system of claim 5, wherein the multiple angles are along the first dimension and a second dimension orthogonal to the first dimension.

7. The optical system of claim 1, wherein:
the optical lens system further includes NA adapters positioned as a first element of the optical lens system to interface with light associated with the spatial array of apertures; and
the NA adapters result in a lower NA than that from the spatial array of apertures; and
there is an optical correction associated with the NA adapters.

8. The optical system of claim 1, wherein the optical lens system includes:
a macrolens common to all apertures of the spatial array of apertures and consisting of a single lens group with no more than three optical elements and having a non-telecentric optical design; and
a microlens array having a corresponding array of optical prescriptions unique to each aperture such that a telecentric condition is eliminated from an optical design of the macrolens and resulting in a lower NA than that from the spatial array of apertures, such that the microlens array acts as an optically-correcting NA converter between the spatial array of apertures and the macrolens.

9. The optical system of claim 8, wherein the complex optical prescription for each microlens of the microlens array includes at least one of spatial offsets, aspheric surfaces, toric surfaces, spherical surfaces, on one or both faces of each of the microlenses of the microlens array.

10. The optical system of claim 9, wherein the prescription of each microlens of the microlens array depends on a radial position of the microlens from a center of the macrolens.

11. The optical system of claim 8, wherein beam diameter or angular divergence in the free space of each of the optical beams propagated from the optical system are determined based on the optical prescription and optical alignment of the microlens of the microlens array from which the optical beam was propagated.

12. The optical system of claim 8, wherein the macrolens is a doublet lens.

13. The optical system of claim 8, wherein the macrolens is a triplet lens.

14. The optical system of claim 1, wherein the spatial array of apertures are uniformly spaced on the interface surface.

15. The optical system of claim 1, wherein the spatial array of apertures are non-uniformly spaced on the interface surface.

16. The optical system of claim 1, wherein the spatial array of apertures is formed in silicon, silicon nitride, glass, plastics, polymers, or compound semiconductors.

17. The optical system of claim 1, wherein the optical system is configured to achieve diffraction-limited performance for all apertures of the spatial array of apertures.

* * * * *